(12) United States Patent
Hong (10) Patent No.: US 8,866,730 B2
(45) Date of Patent: Oct. 21, 2014

(54) CONNECTOR AND A DISPLAY APPARATUS HAVING THE SAME

(71) Applicant: Samsung Display Co., Ltd., Gyeonggi-do (KR)

(72) Inventor: Won-Kee Hong, Gyeonggi-do (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/971,919

(22) Filed: Aug. 21, 2013

(65) Prior Publication Data

US 2013/0335689 A1 Dec. 19, 2013

Related U.S. Application Data

(63) Continuation of application No. 12/263,832, filed on Nov. 3, 2008, now Pat. No. 8,537,096.

(30) Foreign Application Priority Data

Jan. 24, 2008 (KR) .......................... 10-2008-007652

(51) Int. Cl.
*G02F 1/33* (2006.01)
*G09G 3/20* (2006.01)
*G02F 1/133* (2006.01)
*G09G 3/34* (2006.01)

(52) U.S. Cl.
CPC ...... *G02F 1/13306* (2013.01); *G09G 2370/047* (2013.01); *G09G 2320/0666* (2013.01); *G09G 2330/06* (2013.01); *G09G 2320/0626* (2013.01); *G09G 3/2096* (2013.01); *G09G 3/3406* (2013.01)
USPC .......................................................... 345/102

(58) Field of Classification Search
CPC .................... G09G 2300/0842; G09G 3/3413; G02F 1/133615; G02F 1/3454; G02F 1/133602
USPC ......... 345/76, 77, 82, 87, 204, 211, 212, 102; 349/61, 149
See application file for complete search history.

(56) References Cited

U.S. PATENT DOCUMENTS

| | | | |
|---|---|---|---|
| 7,348,971 B2 | 3/2008 | Chimura | |
| 7,580,013 B2 * | 8/2009 | Yaguma et al. | ................ 345/77 |
| 7,911,217 B2 | 3/2011 | Nam | |
| 8,018,401 B2 * | 9/2011 | Shin | ............................. 345/76 |

(Continued)

FOREIGN PATENT DOCUMENTS

| | | |
|---|---|---|
| CN | 1721943 | 1/2006 |
| JP | 03-073011 | 3/1991 |

(Continued)

OTHER PUBLICATIONS

Examination Report dated Feb. 12, 2013 issued in corresponding Japanese Application No. 2008-113979.

*Primary Examiner* — Abbas Abdulselam
(74) *Attorney, Agent, or Firm* — F. Chau & Associates, LLC (57) ABSTRACT

A display apparatus including: a backlight unit generating a light; a display panel receiving the light to display an image; a backlight driving circuit receiving a driving power and a control signal from an external system to drive the backlight unit; a display panel control circuit receiving a driving signal and an image signal from the external system to control the display panel; and a connector electrically connecting the external system to the backlight driving circuit and the display panel control circuit, wherein the driving power, the control signal, the driving signal and the image signal are transmitted through the connector.

12 Claims, 5 Drawing Sheets

(56) References Cited

U.S. PATENT DOCUMENTS

| | | |
|---|---|---|
| 8,040,317 B2 | 10/2011 | Teshirogi |
| 8,154,493 B2 | 4/2012 | Kimura et al. |
| 8,174,487 B2 | 5/2012 | Furukawa et al. |
| 2004/0125068 A1 | 7/2004 | Lee |
| 2005/0012704 A1 | 1/2005 | Chimura |
| 2007/0005875 A1 | 1/2007 | Oshima |
| 2007/0008276 A1 | 1/2007 | Wang |
| 2007/0279374 A1 | 12/2007 | Kimura et al. |

FOREIGN PATENT DOCUMENTS

| | | |
|---|---|---|
| JP | 06-083566 | 3/1994 |
| JP | 08-063327 | 3/1996 |
| JP | 08-241043 | 9/1996 |
| JP | 11-134076 | 5/1999 |
| JP | 2000-172184 | 6/2000 |
| JP | 2001-108969 | 4/2001 |
| JP | 2003-122265 | 4/2003 |
| JP | 2003-347693 | 12/2003 |
| JP | 2004-334867 | 11/2004 |
| JP | 2005-274935 | 10/2005 |
| JP | 2006-107417 | 4/2006 |
| JP | 2006-156866 | 6/2006 |
| JP | 2007-072285 | 3/2007 |
| KR | 1020060032259 | 4/2006 |
| KR | 1020070005875 | 1/2007 |

* cited by examiner

CONNECTOR AND A DISPLAY APPARATUS HAVING THE SAME

CROSS-REFERENCE TO RELATED APPLICATIONS

This application is a Continuation of U.S. application Ser. No. 12/263,832 filed on Nov. 3, 2008, which claims priority under 35 U.S.C. §119 to Korean Patent Application No. 10-2008-007652 filed on Jan. 24, 2008, the disclosures of which are incorporated by reference herein in their entireties.

BACKGROUND

1. Technical Field

The present invention relates to a connector that is capable of preventing signal interference from occurring between its pins and a display apparatus having the connector.

2. Discussion of the Related Art

In general, a liquid crystal display (LCD) adopts a low voltage differential signaling (LVDS) interface scheme or a digital visual interface (DVI) scheme for receiving video signals from an external system to drive its display panel.

LCD technology improvements have increased display resolutions to the point where the above-mentioned interface schemes no longer support the bandwidth requirements for certain high resolution data. For this reason, an interface scheme, known as display port, has been developed.

For example, in a notebook computer, the LVDS interface scheme is employed for internal connections and the DVI scheme is employed for external connections. The display port interface scheme integrally combines the internal interface scheme (LVDS) with the external interface scheme (DVI) so that connections between the notebook's internal circuitry and external devices can be achieved through a single interface. In doing so, the capabilities of two interfaces are combined into one interface, and a broad data bandwidth for high resolution display is ensured.

For example, the display port interface scheme provides a maximum bandwidth of 10.8 Gbps, which is twice the maximum bandwidth of 4.95 Gbps for the DVI scheme. In addition, the display port interface scheme supports multiple streams using a micro packet architecture, thereby enabling simultaneous transmission of up to six 1080i streams (or three 1080p streams) through one connector. Further, the display port interface scheme provides a bidirectional auxiliary channel having a bandwidth of 1 Mbps, so that various applications, such as image chatting and voice over internet protocol (VoIP), are realized.

Although the display port interface scheme is capable of providing enough bandwidth to satisfy high resolution data requirements, the pinout of the data port interface is susceptible to signal interference. Accordingly, there exists a need for preventing signal interference from occurring between the pins of a data port connector.

SUMMARY OF THE INVENTION

In an exemplary embodiment of the present invention, a display apparatus comprises: a backlight unit generating a light; a display panel receiving the light to display an image; a backlight driving circuit receiving a driving power and a control signal from an external system to drive the backlight unit; a display panel control circuit receiving a driving signal and an image signal from the external system to control the display panel; and a connector electrically connecting the external system to the backlight driving circuit and the display panel control circuit, wherein the driving power, the control signal, the driving signal and the image signal are transmitted through the connector.

The connector comprises a plurality of pins that are arranged in one direction on a same plane.

The pins comprise a driving power part transferring the driving power, a control signal part transferring the control signal, a driving signal part transferring the driving signal, and an image signal part transferring the image signal.

The driving signal part comprises: a plurality of ground pins that receive a ground voltage from the external system, wherein at least one of the ground pins is positioned at an outermost region of the connector; at least one voltage pin positioned adjacent to the outermost ground pin to receive a driving voltage from the external system to drive the display apparatus; and a display information pin providing extended display identification data of the display apparatus, which are preset in the display apparatus, to the external system.

The image signal part is provided between the voltage pin and the display information pin and comprises a plurality of main link pins that receive the image signal from the external system.

The image signal part further comprises a plurality of auxiliary link pins positioned adjacent to the main link pins in a one-to-one relationship to support the main link pins, and at least one of the ground pins is provided adjacent to a pair of the main link pin and the auxiliary link pin.

The image signal part further comprises at least one extra main link pin and at least one extra auxiliary link pin, which are positioned adjacent to each other.

The display apparatus further comprises an auxiliary display information pin positioned outward from the display information pin to support the display information pin, wherein two of the ground pins are provided outward from the auxiliary display information pin.

The display apparatus further comprises an enable voltage pin that receives a voltage from the external system to enable the display information pin.

The control signal part is positioned adjacent to the display information pin and comprises at least one control pin that receives the control signal from the external system to control brightness and color of the of light generated by the backlight.

The control signal comprises data and clocks which are transmitted through a system management bus or an Inter-Integrated Circuit (I²C) interface.

Two of the ground pins are provided between the control pin and the display information pin.

The driving power part comprises: a plurality of first voltage pins having a positive polarity, which are provided outward from the control pin and receive a driving voltage having the positive polarity, which is used for the backlight unit, from the external system; and a plurality of second voltage pins having a negative polarity, which are provided between the control pin and the first voltage pins and receive a driving voltage having the negative polarity, which is used for the backlight unit, from the external system.

In an exemplary embodiment of the present invention, a display apparatus that displays an image in response to signals received from an external system is provided, the display apparatus comprising: a display panel displaying an image; a backlight unit providing a light to the display panel; a display panel control circuit controlling an operation of the display panel; a backlight driving circuit driving the backlight unit; and a connector electrically connecting an external system to the display apparatus to provide signals from the external system to the display apparatus, wherein the connector comprises a display connecting unit that connects the display panel control circuit to the external system, and the display connecting unit comprises: a plurality of ground pins that receive a ground voltage from the external system, wherein at least one of the ground pins is positioned at an outermost region of the connector; at least one voltage pin positioned adjacent to the outermost ground pin to receive a driving voltage from the external system to drive the display apparatus; a display information pin providing extended display identification data of the display apparatus, which are preset in the display apparatus, to the external system; and a plurality of main link pins, which are provided between the voltage pin and the display information pin and receive a display signal from the external system to display the image on the display apparatus.

The connector further comprises a backlight connecting unit that connects the backlight driving circuit to the external system, wherein the backlight connecting unit comprises: at least one control pin, which is positioned adjacent to the display connecting unit and receives a control signal from the external system to control brightness or color of the light generated by the backlight unit; a plurality of first voltage pins having a positive polarity, which are provided outward from the control pin and receive a driving voltage having the positive polarity, which is used for the backlight unit, from the external system; and a plurality of second voltage pins having a negative polarity, which are provided between the control pin and the first voltage pins and receive a driving voltage having the negative polarity, which is used for the backlight unit, from the external system. The backlight unit comprises a plurality of light sources including red, green and blue diodes.

The driving voltage having the positive polarity has a voltage level in a range of about 7V to about 20V.

Image data and clocks are provided to the main link pins as a display signal, and the extended display identification data, which comprise data and clock capabilities of the display apparatus, are provided to the display information pin.

The display connecting unit further comprises a plurality of auxiliary link pins positioned adjacent to the main link pins in a one-to-one relationship to support the main link pins. At least one of the ground pins is provided adjacent to a pair of the main link pin and the auxiliary link pin.

The display connecting unit further comprises at least one extra main link pin and at least one extra auxiliary link pin, which are positioned adjacent to each other.

The display connecting unit further comprises an auxiliary display information pin positioned outward from the display information pin to support the display information pin, wherein two of the ground pins are provided outward from the auxiliary display information pin.

The display connecting unit further comprises an enable voltage pin that receives a voltage from the external system to enable the display information pin.

In an exemplary embodiment of the present invention, a connector for electrically connecting an external system to a display apparatus comprises: a display connecting unit that connects a display panel control circuit of a display apparatus to an external system, the display connecting unit comprising: a plurality of ground pins that receive a ground voltage from the external system, wherein at least one of the ground pins is positioned at an outermost region of the connector; at least one voltage pin positioned adjacent to the outermost ground pin to receive a driving voltage from the external system to drive the display apparatus; a display information pin providing extended display identification data of the display apparatus, which are present in the display apparatus, to the external system; and a plurality of main link pins, which are provided between the voltage pin and the display information pin and receive a display signal from the external system to display an image on the display apparatus.

The connector further comprises a backlight connecting unit that connects a backlight driving circuit of the display apparatus to the external system, the backlight connecting unit comprises: at least one control pin, which is positioned adjacent to the display connecting unit and receives a control signal from the external system to control brightness or color of light generated by a backlight unit of the display apparatus; a plurality of first voltage pins having a positive polarity, which are provided outward from the control pin and receive a driving voltage having the positive polarity, which is used for the backlight unit, from the external system; and a plurality of second voltage pins having a negative polarity, which are provided between the control pin and the first voltage pins and receive a driving voltage having the negative polarity, which is used for the backlight, from the external system.

BRIEF DESCRIPTION OF THE DRAWINGS

The above and other features of the present invention will become more apparent by describing in detail exemplary embodiments thereof with reference to the accompanying drawings in which.

DESCRIPTION OF EXEMPLARY EMBODIMENTS

Exemplary embodiments of the present invention will be described more fully hereinafter with reference to accompanying drawings. This invention may, however, be embodied in many different forms and should not be construed as being limited to the embodiments set forth herein.

Figure 1:
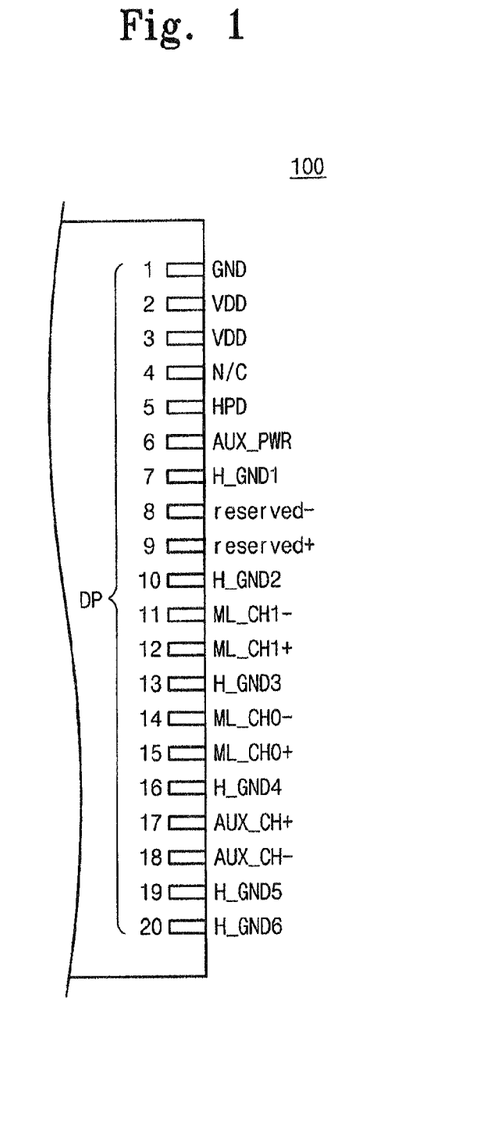
FIG. 1 is a plan view showing a connector according to an exemplary embodiment of the present invention.

FIG. 1 is a plan view showing a connector according to an exemplary embodiment of the present invention.

Referring to FIG. 1, the connector 100 connects a display apparatus to an external system and includes a display connecting unit DP that receives signals from the external system to drive a display panel provided in the display apparatus. For instance, the connector 100 of the present exemplary embodiment may be a display port connector employing a display port interface scheme.

According to the conventional low voltage differential signaling (LVDS) interface scheme and the conventional digital visual interface (DVI) scheme, a pin that is used to transmit image data is provided separately from a pin that is used to transmit clocks. However, according to the display port interface scheme, the image data and clocks may be transmitted through one pin, so that the number of pins provided in the connector 100 may be reduced as compared with that of connectors employing the conventional interface schemes.

In the present exemplary embodiment, the display connecting unit DP of the connector 100 includes twenty pins. In detail, the display connecting unit DP includes an outermost ground pin GND, and first to sixth ground pins H_GND1 to H_GND6.

The outermost ground pin GND is positioned at the outermost portion of the connector 100 and is adjacent to one end of the connector 100 to receive a ground voltage from the external system. In the present exemplary embodiment, the outermost ground pin GND corresponds to the first pin of the twenty pins.

The first to fourth ground pins H_GND1 to H_GND4 are provided at the middle portion of the connector 100 to prevent signal interference when signals are transmitted to pins adjacent to the first to fourth ground pins H_GND1 to H_GND4. In the present exemplary embodiment, the first to fourth ground pins H_GND1 to H_GND4 correspond to the seventh, tenth, thirteenth and sixteenth pins, respectively. The fifth and sixth ground pins H_GND5 and H_GND6 are provided at the other end of the connector 100 in opposition to the ground pin GND. Thus, the fifth and sixth ground pins H_GND5 and H_GND6 correspond to the nineteenth and twentieth pins, respectively.

The display connecting unit DP includes at least one voltage pin VDD, which is provided adjacent to the outermost pin GND to receive a driving voltage from the external system to drive the display apparatus. In the present exemplary embodiment, two voltage pins VDD are provided. The two voltage pins VDD correspond to the second and third pins, respectively. The driving voltage applied to the voltage pin VDD has a voltage level of about 3.3V.

The display connecting unit DP includes a display information pin AUX_CH+ that transmits extended display identification data (EDID) of the display apparatus to the external system and an auxiliary display information pin AUX_CH− that receives auxiliary display information. For example, the EDID is stored in an internal memory provided in the display apparatus, so that the EDID can be provided to the external system through the display information pin AUX_CH+ when the display port connector is connected to the external system.

The display information pin AUX_CH+ and the auxiliary display information pin AUX_CH− are provided adjacent to the fifth and sixth ground pins H_GND5 and H_GND6 and the display information pin AUX_CH+ is arranged behind the auxiliary display information pin AUX_CH− when viewed from the fifth ground pin H_GND5. In detail, the display information pin AUX_CH+ and the auxiliary display information pin AUX_CH− correspond to the seventeenth and eighteenth pins, respectively.

The display connecting unit DP further includes an enable voltage pin AUX_PWR that receives voltage from the external system to enable the display information pin AUX_CH+ and the auxiliary display information pin AUX_CH−. Similar to the driving voltage, the voltage applied to the enable voltage pin AUX_PWR has a voltage level of about 3.3V. In the present exemplary embodiment, the enable voltage pin AUX_PWR corresponds to the sixth pin of the connector 100.

A plurality of main link pins are included in the display connecting unit DP to receive display signals from the external system to display an image on the display apparatus.

The display signals include image data and clocks used to display the image on the display apparatus. For example, different from the conventional LVDS interface scheme and the conventional DVI scheme that require two pins to transmit image data and clocks, respectively, the display port interface scheme may simultaneously transmit the image data and clocks through one pin by compressing the image data and clocks into a display signal. In addition, if the display port interface scheme is employed, a signal including data and clocks corresponding to display information may be transmitted to the display information pin AUX_CH+. Thus, the connector 100 employing the display port interface scheme according to the present exemplary embodiment may reduce the number of pins as compared with a connector employing one of the conventional interface schemes.

In the present exemplary embodiment, a first main link pin ML_CH0+ and a first auxiliary link pin ML_CH0− are adjacent to each other and a second main link pin ML_CH1+ and a second auxiliary link pin ML_CH1− are adjacent to each other. In the present exemplary embodiment, the first and second main link pins ML_CH0+ and ML_CH1+ correspond to the fifteenth and twelfth pins of the connector 100, respectively, and the first and second auxiliary link pins ML_CH0− and ML_CH1− correspond to the fourteenth and eleventh pins of the connector 100, respectively.

As the resolution of the display apparatus may become increased, the number of pins required for signal transmission may need to be increased. For this reason, the display connecting part DP further includes an extra main link pin reserved+ and an extra auxiliary link pin reserved−. In the present exemplary embodiment, the extra main link pin reserved+ and the extra auxiliary link pin reserved− correspond to the ninth and eighth pins of the connector 100, respectively.

As shown in FIG. 1, since the third ground pin H_GND3 is provided between a pair of the first main link pin ML_CH0+ and the first auxiliary link pin ML_CH0− and a pair of the second main link pin ML_CH1+ and the second auxiliary link pin ML_CH1−, signals received through these pins may be prevented from interfering with each other.

The display connecting unit DP may further include a no-connecting pin N/C and a hot plug detection pin HPD that detects a hot plug event.

Figure 2:
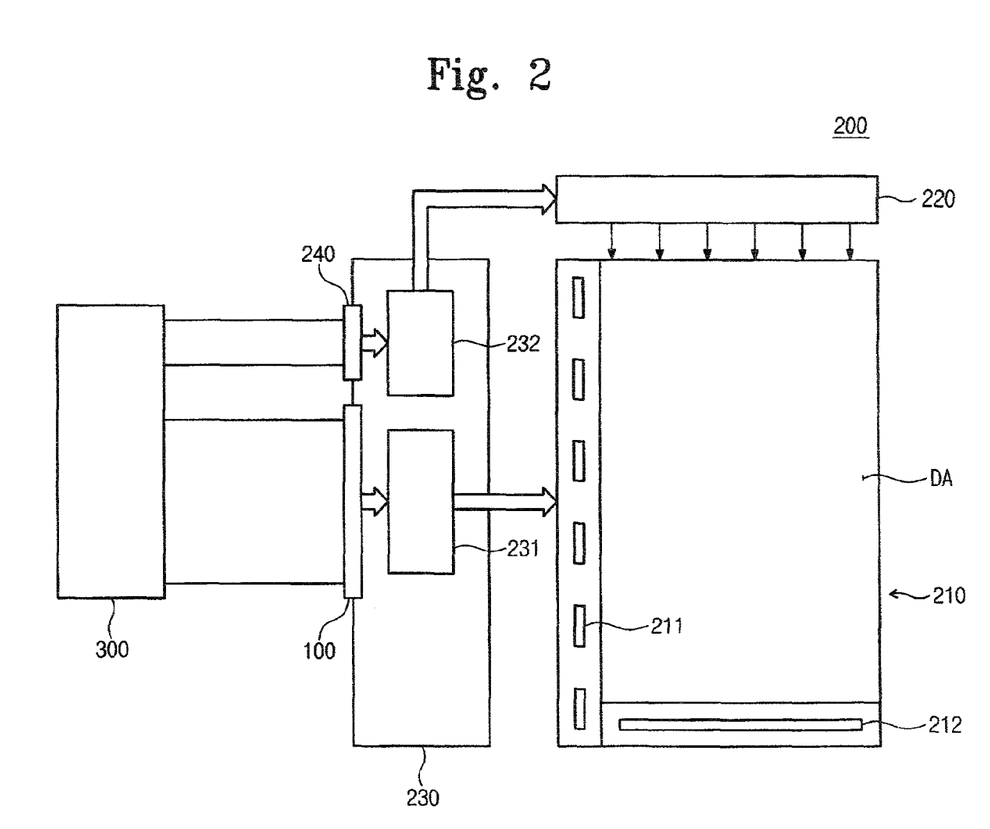
FIG. 2 is a plan view showing a display apparatus according to an exemplary embodiment of the present invention, which includes the connector shown in FIG. 1.

FIG. 2 is a plan view showing a display apparatus according to an exemplary embodiment of the present invention, which includes the connector shown in FIG. 1.

Referring to FIG. 2, the display apparatus 200 includes a display panel 210, a backlight 220 for providing light to the display panel 210, a driving circuit substrate 230 for receiving various signals from an external system 300 to drive the backlight 220 and the display panel 210, the connector 100 for connecting the driving circuit substrate 230 to the external system 300, and a backlight connector 240.

The display panel 210 is divided into a display area DA where a plurality of pixels (not shown) are provided to display images and a peripheral area PA adjacent to the display area DA. A data driving circuit 211 and a gate driving circuit 212 are provided in the peripheral area PA to output data signals and gate signals to drive the pixels. According to an exemplary embodiment of the present invention, the data driving circuit 211 includes a plurality of chips and is mounted on the display panel 210, and the gate driving circuit 212 is integrally formed with the display panel 210 through a thin film forming process.

The backlight 220 includes a light source, such as a cold cathode fluorescence lamp or a white light emitting diode. The light source is arranged adjacent to a rear surface of the display panel 210. Light output from the backlight 220 is provided to the display panel 210, and then, output to the exterior after its transmittance is adjusted by the pixels, so that a desired image may be displayed on the display panel 210.

The driving circuit substrate 230 includes a display panel control circuit 231 that provides various control signals to the data driving circuit 211 and the gate driving circuit 212 to control the operation of the display panel 210. In addition, the driving circuit substrate 230 includes a backlight driving circuit 232 that provides a driving signal to control the operation of the light source provided in the backlight 220.

The driving circuit substrate 230 includes the connector 100 that receives signals from the external system 300 through a display port interface scheme to drive the display panel 210, and the backlight connector 240 that receives signals from the external system 300 to drive the backlight 220.

Upon receiving the signals from the external system 300, the connector 100 transmits the signals to the display panel control circuit 231, and the backlight connector 240 transmits the signals to the backlight driving circuit 232.

The connector 100 receives the signals from the external system 300 through the display port interface scheme. Since the connector 100 has the port structure as shown in FIG. 1, the number of pins of the connector 100 may be reduced and the signals may be prevented from interfering with each other.

Figure 3:
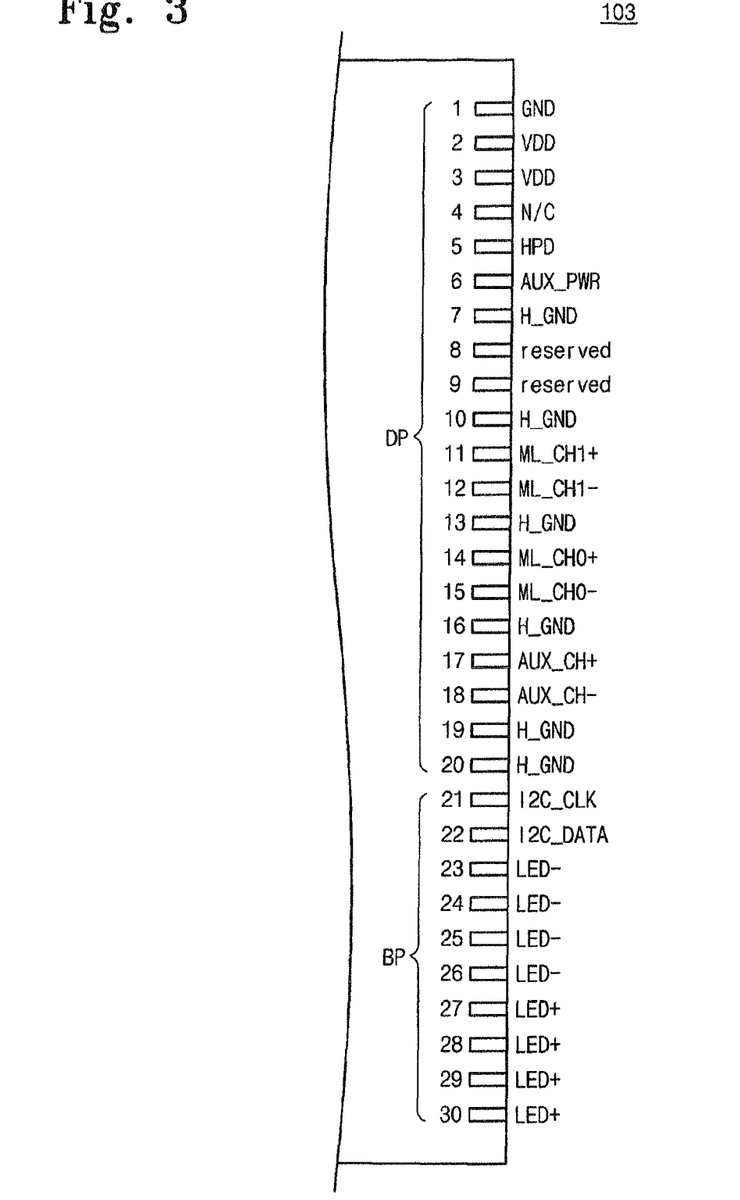
FIG. 3 is a plan view showing a connector according to an exemplary embodiment of the present invention.
Figure 4:
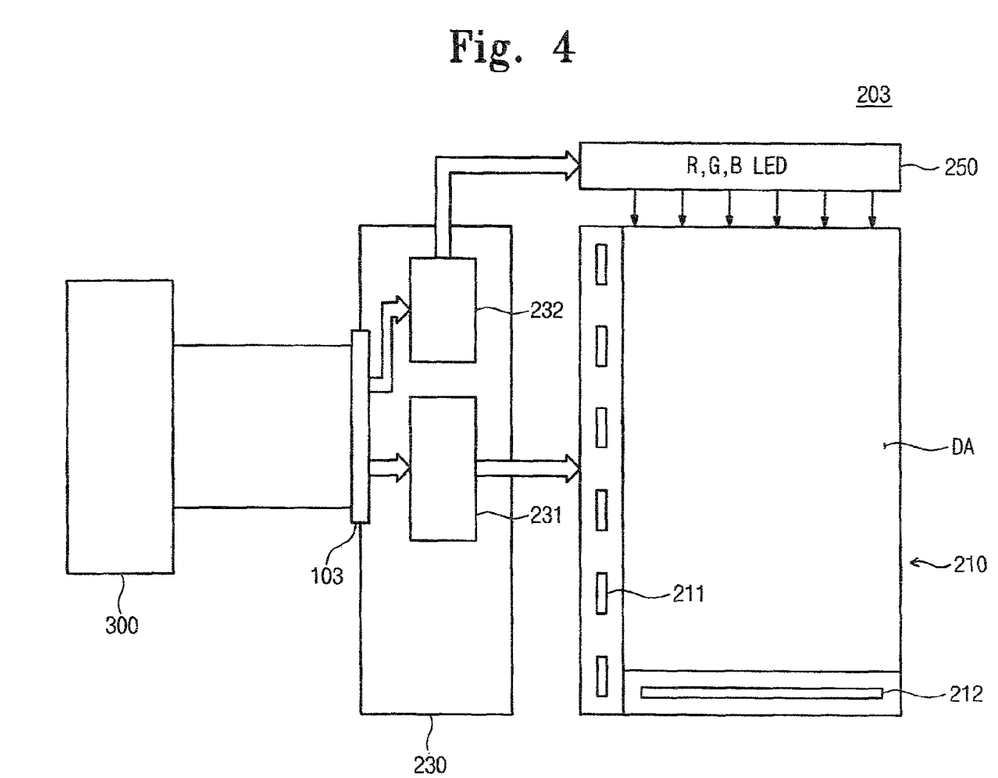
FIG. 4 is a plan view showing a display apparatus according to an exemplary embodiment of the present invention, which includes the connector shown in FIG. 3.

FIG. 3 is a plan view showing a connector according to an exemplary embodiment of the present invention, and FIG. 4 is a plan view showing a display apparatus according to an exemplary embodiment of the present invention, which includes the connector shown in FIG. 3. In FIGS. 3 and 4, the same reference numerals denote the same elements in FIGS. 1 and 2, and thus detailed descriptions of the same elements will be omitted.

Referring to FIG. 3, the connector 103 includes the display connecting unit DP that receives signals from the external system 300 to drive the display panel 210 provided in the display apparatus 203, and a backlight connecting unit BP that receives signals from the external system 300 to drive a backlight 250 provided in the display apparatus 203.

The display connecting unit DP has a structure identical to that of the display connecting unit DP shown in FIG. 1.

The backlight connecting unit BP includes at least one control pin, a plurality of voltage pins LED+ having positive polarity, and a plurality of voltage pins LED− having negative polarity.

The control pins are aligned adjacent to the display connecting unit DP and receive signals from the external system 300 to control brightness and color of light output from the backlight 250. In the present exemplary embodiment, the control pins may receive these signals from the external system 300 through an Inter-Integrated Circuit ($I^2C$) interface or a system management bus (SM-BUS). If the $I^2C$ interface or the system management bus (SM-BUS) is employed, the backlight connecting unit BP receives data signals and clock signals through data lines and clock lines. Thus, the control pins may serve as data pins and clock pins. In the present exemplary embodiment, when the $I^2C$ interface is employed, the control pins include an $I^2C$ data pin $I^2C\_DATA$ and an $I^2C$ clock pin $I^2C\_CLK$. The $I^2C$ data pin $I^2C\_DATA$ and the $I^2C$ clock pin $I^2C\_CLK$ correspond to a twenty-second pin and a twenty-first pin of the connector 103, respectively.

The voltage pins LED+ having positive polarity are provided outward from the $I^2C$ data pin $I^2C\_DATA$ and the $I^2C$ clock pin $I^2C\_CLK$ and receive a driving voltage having positive polarity, which is used for the backlight 250, from the external system 300. According to the present exemplary embodiment, four voltage pins LED+ are provided. In this case, the four voltage pins LED+ correspond to a twenty-seventh pin, a twenty-eighth pin, a twenty-ninth pin and a thirtieth pin of the connector 103, respectively. The driving voltage having positive polarity has a voltage level in the range of about 7V to about 20V.

The voltage pins LED− having negative polarity are provided between the $I^2C$ data pin $I^2C\_DATA$ and the voltage pins LED+ having positive polarity and receive a driving voltage having negative polarity, which is used for the backlight 250, from the external system 300. According to the present exemplary embodiment, four voltage pins LED− are provided. In this case, the four voltage pins LED− correspond to a twenty-third pin, a twenty-fourth pin, a twenty-fifth pin and a twenty-sixth pin of the connector 103, respectively.

Referring to FIG. 4, the display apparatus 203 is electrically connected to the external system 300 through the connector 103. Since the connector 103 has the backlight connecting unit BP, the display apparatus 203 may be connected to the external system 300 by using the connector 103 only.

The backlight 250 of the display apparatus 203 may include a light source having red, green and blue light emitting diodes (RGB LEDs), which are prepared in the form of a package. The backlight driving circuit 232 receives the control signals from the external system 300 through the $I^2C$ data pin $I^2C\_DATA$ and the $I^2C$ clock pin $I^2C\_CLK$ of the connector 103 to control the chromaticity coordinate of light output from the red, green and blue light emitting diodes (RGB LEDs). In addition, the backlight driving circuit 232 receives voltages from the external system 300 through the voltage pins LED+ and LED− to drive the red, green and blue light emitting diodes (RGB LEDs).

As mentioned above, since the connector 103 has the display connecting unit DP and the backlight connecting unit BP, the display apparatus 203 may be connected to the external system 300 through one connector 103, so that the number of the connectors may be reduced. In addition, since the voltage pins LED+ having positive polarity, which require a relatively high voltage, are provided at the outermost region of the connector 103, the voltage pins LED+ may not interfere with signals applied to the display connecting unit DP.

Figure 5:
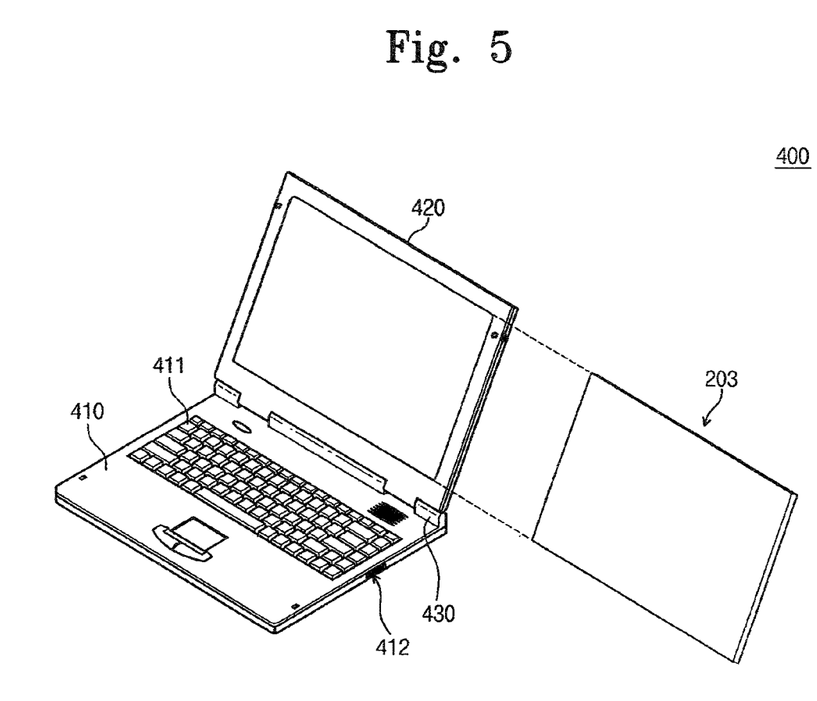
FIG. 5 is a perspective view showing a portable computer according to an exemplary embodiment of the present invention, which includes the display apparatus shown in FIG. 4.

FIG. 5 is a perspective view showing a portable computer according to an exemplary embodiment of the present invention, which includes the display apparatus shown in FIG. 4.

Referring to FIG. 5, the portable computer 400 includes a body 410, a display unit 420 connected to the body 410 and a hinge unit 430 that connects the body 410 to the display unit 420.

The body 410 has a rectangular plate-like shape, and various components and substrates are provided in the body 410. A keyboard 411 that serves as an input device is provided on the body 410. In addition, an external connector 412 is provided at a lateral side of the body 410 to connect the body 410 to various external devices (not shown). The external connector 412 receives signals through a display port interface scheme.

Since the display unit 420 is connected to the body 410 through the hinge unit 430, the opening/closing operation of the portable computer 400 may be possible. The display apparatus 203 shown in FIG. 4 is accommodated in the display unit 420.

As shown in FIG. 4, the display apparatus 203 includes the connector 103 (shown in FIG. 4) that connects the display apparatus 203 to the external system 300, which is provided in the body 410 shown in FIG. 5. The connector 103 receives various signals from the body 410 through a display port interface scheme.

In this manner, the interface scheme of the external connector 412 mounted on the body 410 and the interface scheme of the connector 103 provided in the display apparatus 203 are the same. Accordingly, different from a conventional monitor, which is equipped with a DVI to LVDS converter, products having the connectors in accordance with the exemplary embodiments of the present invention may be directly connected to each other by using only one interface, thus eliminating the need to convert between different interface schemes employed by a PC and an LCD panel, for example.

According to the exemplary embodiments described above, the connector has its pins arranged in the sequence of ground pins, voltage pins, main link pins and display information pins, so that signal interference may be prevented from occurring between its pins. In addition, the connector further includes pins that transmit signals to the backlight control circuit, so that the backlight connector may be omitted from the display apparatus. As a result, the number of connectors provided in the display apparatus may be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display apparatus, comprising:
    a backlight driving circuit configured to control a backlight unit;
    a display panel control circuit configured to control a display panel; and
    a connector including a plurality of pins and configured to electrically connect an external device to the backlight driving circuit and the display panel control circuit,
    wherein the plurality of pins comprises first pins providing a driving power and a control signal to the backlight driving circuit and second pins providing an image signal and a driving signal to the display panel control circuit.

2. The display apparatus as claimed in claim 1, wherein the second pins comprise:
    at least one ground pin provided at a first outermost region of the connector and configured to receive a ground voltage from the external device;
    at least one voltage pin provided adjacent to the at least one ground pin to receive a driving voltage from the external device to drive the display panel; and
    a display information pin configured to provide extended display identification data of the display apparatus to the external device.

3. The display apparatus as claimed in claim 2, wherein the second pins further comprise:
    at least one image signal pin configured to provide the image signal.

4. The display apparatus as claimed in claim 3, wherein the at least one ground pin is provided outward from the image signal pin.

5. The display apparatus as claimed in claim 2, wherein the second pins further comprise:
    a plurality of main link pins configured to receive the image signal from the external device.

6. The display apparatus as claimed in claim 5, wherein the second pins further comprise:
    a plurality of auxiliary link pins provided adjacent to the main link pins and the ground pin is provided adjacent to a pair of the main link pin and the auxiliary link pin.

7. The display apparatus as claimed in claim 6, wherein the second pins further comprises at least one extra main link pin and at least one extra auxiliary pin, which are provided adjacent to each other.

8. The display apparatus as claimed in claim 2, wherein the first pins are provided adjacent to the display information pin and comprise at least one control pin that receives the control signal from the external device to control brightness of light generated from the backlight unit.

9. The display apparatus as claimed in claim 8, wherein the control signal comprises data and clocks which are transmitted through a system management bus or an I2C interface from the external device.

10. The display apparatus as claimed in claim 9, wherein the first pins further comprise at least one backlight ground pin provided adjacent to the control signal pin.

11. The display apparatus as claimed in claim 10, wherein the first pins further comprise:
    a plurality of first voltage pins provided outward from the control pin and receive a driving voltage having a first voltage level, which is used for the backlight unit, from the external device; and
    a plurality of second voltage pins provided between the control pins and the first voltage pins and receive a driving voltage having a second voltage level, which is used for the backlight unit, from the external device,
    wherein the first voltage level is higher than the second voltage level.

12. The display apparatus as claimed in claim 10, wherein at least one backlight ground pin provided at a second outermost region of the connector is in opposition to the first outermost region.

* * * * *